United States Patent [19]

Eberhardt

[11] Patent Number: 4,715,327

[45] Date of Patent: Dec. 29, 1987

[54] FLOW SYSTEM FOR ENGINE-PUMP ASSEMBLY

[75] Inventor: H. Alfred Eberhardt, Paoli, Pa.

[73] Assignee: Hale Fire Pump Company, Conshohocken, Pa.

[21] Appl. No.: 866,384

[22] Filed: May 23, 1986

[51] Int. Cl.4 .......................... F02P 5/14; F02P 11/14
[52] U.S. Cl. .................... 123/41.15; 123/547; 261/144; 261/DIG. 20; 417/364
[58] Field of Search ............... 123/41.15, 547, 546; 261/DIG. 20, 144

[56] References Cited

U.S. PATENT DOCUMENTS

| | | | |
|---|---|---|---|
| 1,832,776 | 11/1931 | Hudson | 123/41.15 |
| 2,767,699 | 10/1956 | Engstrom | 123/547 |
| 3,150,642 | 9/1964 | Hollabaugh | 261/DIG. 20 |
| 3,292,427 | 12/1966 | Mattson | 123/41.15 |
| 3,762,385 | 10/1973 | Hollnagel | 261/144 |
| 4,256,066 | 3/1981 | Serruys | 261/144 |
| 4,286,564 | 9/1981 | Tuyl | 261/144 |
| 4,302,407 | 11/1981 | Hartel | 261/144 |
| 4,404,948 | 9/1983 | Feltrin | 123/547 |
| 4,615,303 | 10/1986 | Sackett | 123/41.15 |

FOREIGN PATENT DOCUMENTS 843582  8/1960  United Kingdom ....... 261/DIG. 20

Primary Examiner—Ronald B. Cox
Attorney, Agent, or Firm—Frank A. Follmer

[57] ABSTRACT

A flow system for an engine-pump assembly utilizes the engine cooling water for heating the engine carburetors to prevent icing thereof and includes a flow indicator providing a visual indication of the condition of the engine's cooling water flow.

12 Claims, 4 Drawing Figures

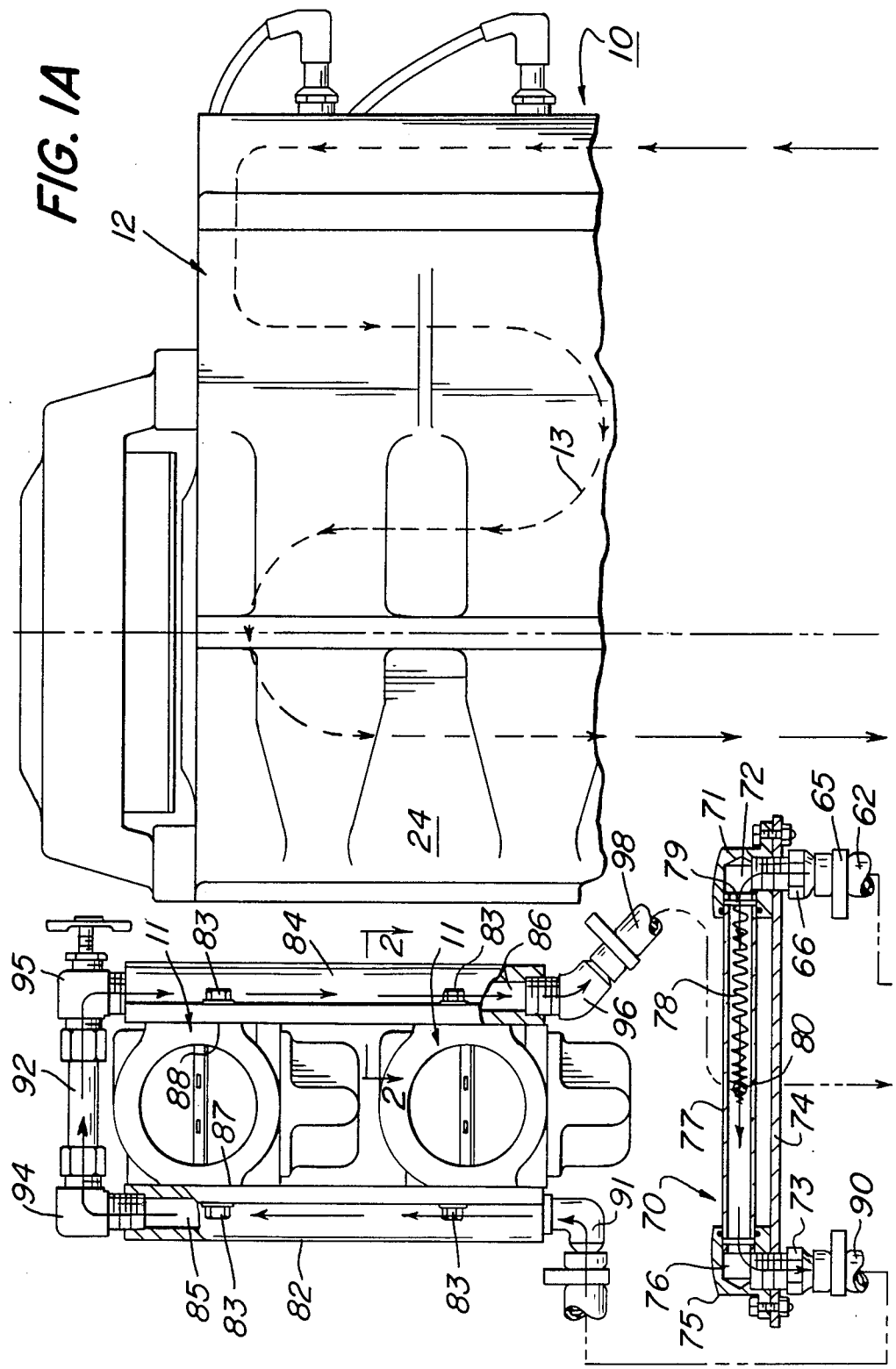

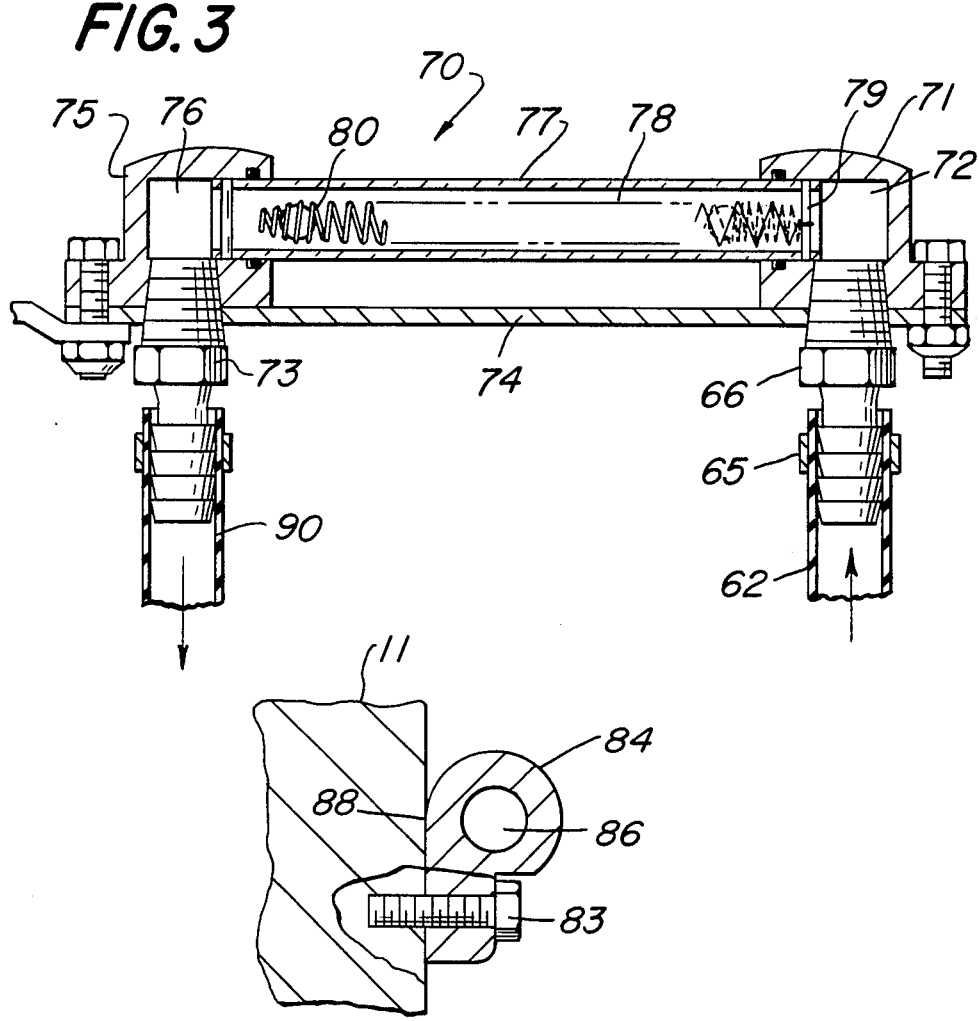

1

FLOW SYSTEM FOR ENGINE-PUMP ASSEMBLY

BACKGROUND AND SUMMARY OF THE INVENTION

This invention relates to a flow system for an engine-pump assembly of the type disclosed in my copending application Ser. No. 707,736 filed Mar. 4, 1985, now U.S. Pat. No. 4,643,652. The engine-pump assembly disclosed in said application is adapted for use in applications such as firefighting on board ships and, to this end, is constructed to be portable, compact and light in weight and, at the same time, be capable of producing a high lift while maintaining a steady high flow volume.

The flow system of the invention is constructed and arranged to provide various advantageous functions in the compact environment of a portable engine-pump assembly of the indicated type. In accordance with one feature of the invention, the flow system is provided with means for utilizing the engine cooling water flow for heating the engine carburetors to prevent icing thereof under low temperature and high humidity conditions of operation. In accordance with a second feature of the invention, the flow system is constructed and arranged to provide a novel means for visually indicating the condition of the engine's cooling water flow so that this flow can be monitored readily by the operator. Another feature of the invention is the provision of a cooling water manifold which is mounted in heat exchange relationship adjacent the muffler for the engine and contains a flow metering orifice and a strainer screen which are heated to prevent icing thereof under low temperature conditions of operation.

The above and other features of the invention will become apparent from a consideration of the following description in conjunction with the accompanying Drawings.

BRIEF DESCRIPTION OF THE DRAWINGS

FIGS. 1A and 1B are the upper and lower portions of a diagrammatic and partly sectional view showing the flow system of the invention. FIGS. 1A and 1B are aligned by the center lines shown thereon.

FIG. 2 is a sectional view taken on line 2—2 of FIG. 1.

FIG. 3 is a fragmentary detail view showing the flow indicator of the flow system of the invention.

DETAILED DESCRIPTION OF THE PREFERRED EMBODIMENT

Figure 1B:
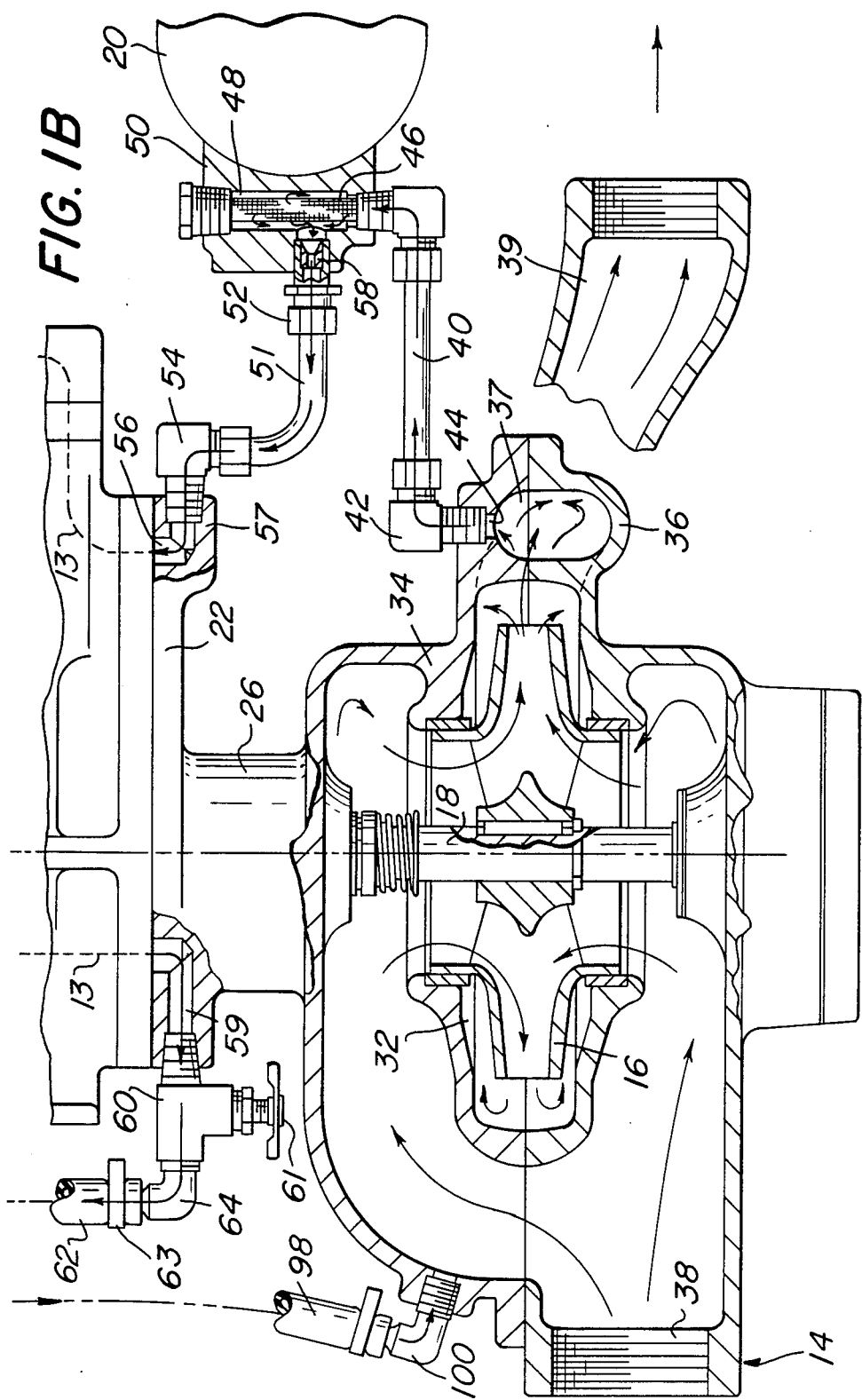

Referring to FIG. 1A, an engine-pump assembly is indicated generally at 10 and is described in detail in said copending application. Briefly stated, the engine pump assembly 10 comprises a high speed, lightweight engine 12 of the two-cycle type used in outboard engines and a lightweight centrifugal pump 14 using a double suction impeller 16 capable of producing a high lift while maintaining a steady high flow volume. The engine 12 is arranged with a vertical crankshaft (not shown) coupled to a vertical pump shaft 18 for driving the pump 14.

As described in detail in said copending application, the engine-pump assembly 10 comprises a frame including a plurality of extruded aluminum tubes welded together to form an open box-like structure with the engine 12 being mounted on the frame by means of suitable shock absorbing mountings. Engine 12 is provided with the conventional elements including a fuel/oil injection pump assembly, an air filter, a starter, a fuel tank, an oil tank, a throttle control and a pair of carburetors 11. Engine 12 is also provided with a novel exhaust system including an exhaust muffler 20 as described in detail in said copending application. As described in said copending application, the bottom end of the engine crankshaft extends outwardly from the bottom wall 22 of the engine housing or block 24 into a region enclosed by a cylindrical wall portion 26. The bottom end of the engine crankshaft is provided with a female spline for coupling to the male spline formed on the upper end of the pump shaft 18.

Pump 14 is mounted within the assembly frame immediately beneath engine 12 and is mounted on the underside of the engine 12 by a plurality of screws with the pump shaft 18 extending vertically and in alignment and concentric with the engine crankshaft. Pump 14 has its impeller 16 mounted on and keyed to the pump shaft 18 for rotation within a volute chamber 32. The body of pump 14 is made of an upper body portion 34 and a lower body portion 36 which cooperate to define volute chamber 32. Lower body portion 36 provides a pump inlet passage 38 and a pump discharge passage 39 oriented in generally horizontal in-line relationship. The flow through the pump passages is shown by the arrows in FIG. 1B.

As described in said copending application, the upper and lower body portions 34, 36 define a pair of flow cut-offs from the discharge of the impeller volute chamber and also a pair of discharge (scroll) passages 37 leading from the flow cut-offs to the pump discharge 39.

As described in said copending application, there is provided exhaust system means for injecting water into the engine exhaust gases for cooling the same, such means comprising means for delivering water from the discharge passage 37 to an exhaust passage contained in an extension of the upper body portion 34 of the pump 14 through which the exhaust gases flow. This cooling water delivery means comprises a tube 40 connected at its upstream end to an elbow fitting 42 which is connected to communicate with the pump discharge passage 37 at an opening 44 in the pump body 34 to tap water at a high pressure. The downstream end of tube 40 is connected to a strainer assembly including a strainer screen 46 which is mounted at the inside of a cooling water manifold 50 supported on muffler 20 in heat exchange relationship therewith. Water is delivered at the pump discharge pressure from tube 40 through the strainer screen 46 into a manifold chamber 48 within manifold 50. As described in detail in said copending application, water is delivered from the manifold chamber 48 to an exhaust gas passage by a conduit which has an exhaust spray check valve assembly connected at its upstream end and an exhaust spray orifice assembly is connected at its downstream end.

In accordance with the present invention the flow system comprises means for delivering cooling water to the cooling passages 13 of the engine 12. To this end, a tube 51 is connected at its upstream end to an engine cooling orifice assembly 52 and at its downstream end to an elbow fitting 54 which is connected to a passage 56 in an extension 57 at the bottom of the engine housing or block 24. The flow through passage 56 is communicated to the inlet of cooling passages 13 for the engine 12 by suitable flow means as is conventional in the art.

The construction of the orifice assembly 52 is such that this assembly communicates with manifold chamber 48 through a passage which leads to a metering orifice member 58. In this manner, a metered amount of cooling water passes from the manifold chamber 48 through the orifice member 58 into the upstream end of tube 51 which then delivers the water to the engine cooling passages 13 through passage 56 for cooling purposes as is conventional in the art. The orifice assembly 52 functions to control the pressure and flow conditions of the cooling water in the flow system.

A feature of the invention is the arrangement of cooling water manifold 50 such that it is mounted in heat exchange relationship adjacent the muffler 20 and such that it contains the flow metering orifice member 58 and the strainer screen 46. By this arrangement both the orifice member 58 and the strainer screen 46 are heated to prevent icing thereof under low temperature conditions of operation. This occurs once the engine 12 begins to run and the hot exhaust gases flow through the muffler 20 to raise the temperature thereof and, accordingly, raise the temperature of the cooling water manifold 50.

The flow system of the invention comprises means for providing a visual indication of the condition of the flow of the cooling water through cooling passages 13 and, to this end, the engine cooling water flow is delivered from the outlet of engine cooling passages 13 through an outlet passage 59 to a tee fitting 60 having a drain cock 61 contained therein. From the fitting 60 the engine cooling water flows through a hose 62 to the inlet of a flow indicator 70. To this end, the hose 62 has its upstream end connected by a conventional clamp 63 to the barbed end of an elbow fitting 64 connected to the tee fitting 60 and has its downstream end connected by a clamp 65 to the barbed end of a fitting 66 mounted on a bonnet 71 at the inlet end of the flow indicator 70. As is best shown in FIG. 3, the inlet end bonnet 71 defines an inlet chamber 72 and is mounted by bolts on a mounting bracket 74 for the flow indicator 70. Another bonnet 75 is mounted by bolts on the bracket 74 at the outlet end of indicator 70 and defines an outlet chamber 76 therein. A transparent tube 77 extends between the bonnets 71 and 75 with its ends received and sealed within bores in said bonnets (See FIG. 3) to provide flow communication between the inlet and outlet chambers 72 and 76 of the flow indicator.

The transparent tube 77 provides a "window" through which the water flowing through the flow system passes and can be visually observed. The flow indicator 70 comprises means for indicating the rate at which the water flows through said "window", i.e., through the interior of the tube 77. Such means comprises an elongated coil spring 78 contained within the tube 77 and having one end secured to a pin 79 fastened at the inlet end of the tube 77 as shown in FIG. 3 and having a free end adapted to move within the tube 77 as the spring 78 expands and contracts between a collapsed condition, as shown in dashed lines in FIG. 3, and a plurality of expanded conditions, two of which are illustrated in the solid line showings of FIG. 1A and FIG. 3. The coil spring 78 is constructed with a relatively low spring rate whereby the spring can be expanded a substantial distance, as shown in the Drawings.

The flow indicating means also comprises a ball 80 which is captured within the interior of the coils of the spring 78 by the construction as shown in FIG. 3. To this end, the spring 78 has the coils at its free end wound into a tapered configuration to thereby capture the ball 80. As is best shown in FIG. 3, the ball 80 assumes a position within the free end of the spring 78 in response to the flow of water through the tube 77 from the inlet to the outlet ends thereof. Ball 80 is colored yellow (or another bright color) so as to be clearly visible and is smaller than the inner diameter of tube 77.

The tube 77, the spring 78, and the ball 80 are constructed and arranged so that the flow through the tube 77 from the inlet to the outlet ends thereof passes around ball 80 resulting in a force being applied to the ball 80 causing it to move toward the outlet end of the tube 77. The movement of the ball 80 in this direction will, of course, cause the spring 78 to expand whereupon the spring 78 applies a counterforce to the ball 80 urging it toward the inlet end of tube 77. The ball 80 will move toward the outer end of tube 77 in response to the force applied thereto as a result of the water flow until this force is met by the counteracting spring force of the expanding spring 78. The arrangement is such that the ball 80 will assume a position which is indicative of the rate of flow of water through the tube 77. It will be apparent that as the cooling water flow rate increases, the ball 80 will assume positions closer to the outlet end of tube 77 and the spring 78 will be expanded a greater amount in response to this increase in flow rate.

In order for the flow indicator 70 to operate as described above, the ball 80 is designed so that its outside diameter area is smaller than the inside diameter of the tube 77 as is shown in FIG. 3. This design results in a generally annular opening for the passage of water around the outside diameter of the ball 80. The ball 80 and the inside diameter of tube 77 are dimensioned to produce a flow area such that under maximum flow conditions (i.e., the maximum flow probable through the engine cooling passages 13), there will be produced a pressure differential across the upstream and downstream sides of the ball 80 with the resultant pressure differential force on the ball 80 urging the same to extend the spring 78 to a position close to the outlet end of tube 77, this position being indicated by the left solid line showing in FIG. 3. In this position the ball will indicate the maximum cooling water flow rate. The pressure differential force produced on the ball 80 will, of course, be matched by the spring force determined by the spring rate at this extended position of the spring 78. In a like manner, the minimum flow rate will produce a resultant pressure differential across the ball 80 acting against the spring 78 such that the ball 80 will move to a position approximately half way between the inlet and outlet ends of tube 77, which position is shown in FIG. 1A. It will be noted that the operation of the flow indicator 70 involves the requirement that the ball 80 be capable of moving a substantial distance between the inlet and outlet ends of the tube 77 and that the spring be designed to accommodate such movement.

The flow indicator 70 is mounted on the engine pump-assembly by the mounting plate 74 at a location easily visible to the operator whereby the position of the ball 80 provides the operator with a visual means for monitoring the flow of cooling water through the engine cooling passages 13. Flow indicator 70 also provides a visual indication to the operator when pump 14 is fully primed. By observing tube 77 of flow indicator 70, the operator can determine that pump 14 is fully primed when he observes that tube 77 is full of water (and does not contain any air or foam) and ball 80 is displaced away from the inlet end of tube 77.

The flow system of the invention also comprises means for heating the engine's carburetors 11. To this end, the carburetors 11 are provided with a first side heat exchanger block 82 and a second side heat exchanger block 84 each being secured in heat exchange relationship onto the sides of the carburetors 11 by a pair of mounting screws 83, one of which is aligned with each of the carburetors 11. The blocks 82 and 84 have the same construction and are made of a material having good heat exchange properties, such as aluminum. Blocks 82 and 84 are arranged to extend vertically and comprise an internal longitudinally extending passage 85 and 86 and a machined flat face 87 and 88, respectively, adapted to mate in good heat exchange contact with a machined face on the side of an associated carburetor (See FIG. 2).

Means are provided for causing the engine cooling water to flow through the internal passages 85 and 86 of the blocks 82 and 84 for transmitting heat thereto. Such means comprises a supply hose 90 for delivering the outlet flow from the flow indicator 70 to the lower end of the internal passage 85 of the first block 82 and a crossover tube 92 for delivering the flow from the upper end of the passage 85 of block 82 to the upper end of the internal passage 86 of the second block 84. The supply hose 90 is connected at its downstream end to an elbow fitting 91 mounted on the lower end of the block 82. The upstream end of hose 90 is connected to the barbed end of an outlet fitting 73 on outlet end bonnet 75 in flow communication with outlet chamber 76 of flow indicator 70. Crossover tube 92 is connected at its upstream end to an elbow fitting 94 mounted on the upper end of block 82 and at its downstream end to an elbow fitting 95 mounted on the upper end of the block 84. A 45° elbow fitting 96 is mounted on the lower end of the block 84 to discharge the flow therefrom to a return hose 98 which delivers the water to an elbow fitting 100 mounted on the upper pump body 34 to deliver the flow to the inlet or low pressure side of the pump 14.

By the above-described arrangement, the flow of water from the outlet of the engine cooling passages 13, which water has been heated to an elevated temperature by the engine, is caused to flow from the flow indicator 70 through the supply hose 90, up through the internal passage 85 in first block 82, through the crossover tube 92, and down the internal passage 86 of the second block 84. This water flow serves to raise the temperature of the blocks 82 and 84 which, through heat conductions, raise the temperature of the engine carburetors 11 above the freezing point. In this manner, the icing of the carburetors 11 at low temperature and high humidity conditions of operation can be prevented.

The flow of water through the flow system of the invention is illustrated by the arrows in FIG. 1. Briefly, water at a high pressure (i.e., approximately the pump discharge pressure) is directed through the hose 40, the strainer 46, and the metering orifice member 58 to the inlet fitting 54 of the engine cooling system. The water supplied to the passages 13 in the engine block 24 is at a relatively low temperature and serves to cool the engine block 24 as it flows through the cooling passages 13 forming the cooling system flow path. The engine block 24 serves to raise the temperature of the water and this water, at an elevated temperature, is caused to flow from the engine cooling system through the fitting 60 and the hose 62 and fitting 66 to the inlet chamber 72 of the flow indicator 70. The water flows through the window tube 77 of the flow indicator 70 causing the ball 80 to be moved to a position indicative of the flow condition of the engine cooling water flow. From the flow indicator 70 the water (still at an elevated temperature) is discharged and flows through the supply hose 90 to the inlet of the carburetor heating means comprising the two heat blocks 82 and 84 whereat the water flows up through the first block 82 across the crossover tube 92 and down through the second block 84 to thereby raise the temperature of the heat blocks 82 and 84 and the carburetors 11 mounted therebetween. The water discharged from the outlet of the heat block 84 passes through the return hose 98 to the low pressure side of the pump 14 to complete the passage of water through the flow system.

What is claimed is:

1. A flow system for an engine-pump assembly having an engine including carburetor means and a cooling system including a cooling water flow path having an inlet and an outlet, and a pump mounted adjacent said engine and including a pump inlet having a water supplied thereto and a pump discharge passage delivering water at a high pressure comprising:

first flow conduit means for delivering water at said high pump pressure from the discharge passage of said pump to the inlet of the cooling water flow path of the engine cooling system, second conduit means for delivering water from the outlet of the cooling water flow path of the engine cooling system to the inlet side of said pump, and a heat exchanger means contained in said second conduit means for applying the heat within said water discharged from said engine cooling system to the engine carburetor means, including a pair of heat exchanger blocks each of which is mounted on a side portion of said carburetor means in good heat conducting contact with said carburetor means, one of said conduit means including a flow indicator comprising a transparent flow tube through which said water flows in the direction from an inlet end to an outlet end thereof, a coil spring having one end secured at said tube inlet end and a free end contained within said flow tube, and an indicator member captured within said free end of said spring, said water flow through said flow tube applying the outlet end of said tube to a position indicative of the rate of cooling water flow.

2. A flow system according to claim 2 wherein said flow indicator includes means providing an inlet and an outlet, said transparent tube extending between said inlet and outlet, said spring having said one end thereof secured adjacent said inlet and said free end thereof movable within said tube toward and away from said outlet, said indicator member comprising a ball captured within said free end of said spring, said ball being constructed and arranged to partially block the flow of water through said tube from the inlet to the outlet whereby the resultant pressure differential force on said ball urges the same away from said inlet toward said outlet of the flow indicator.

3. A flow system according to claim 2 wherein said coil spring being constructed and arranged to resist said movement of said ball and to bias the same toward a position near said inlet, said spring being expandable from a collapsed condition near said inlet to allow said ball to move a substantial distance toward said outlet, the parts being constructed and arranged so that said ball assumes a position between said inlet and outlet to indicate the rate of cooling water flow.

4. A flow system according to claim 3 wherein said ball has a brightly colored surface so as to be clearly visible through said tube.

5. A flow system according to claim 2 wherein said ball has a bright colored surface so as to be clearly visible through said tube.

6. A flow system for an engine-pump assembly having an engine including carburetor means and a cooling system including a cooling water flow path having an inlet and an outlet, and a pump mounted adjacent said engine and including a pump inlet having water supplied thereto and a pump discharge passage delivering water at a high pressure comprising:

first flow conduit means for delivering water at said high pump pressure from the discharge passage of said pump to the inlet of the cooling water flow path of the engine cooling system, second conduit means for delivering water from the outlet of the cooling water flow path of the engine cooling system to the inlet side of said pump, said carburetor means including at least two carburetors adjacent one another, a heat exchanger means contained in said second conduit means for applying the heat within said water discharged from said engine cooling system to said two carburetors to prevent icing thereof;

said heat exchanger means including a pair of heat exchanger blocks, one block being mounted on a first side portion of the bodies of said carburetors in good heat conducting contact therewith, and the other block being mounted on a second side portion of the bodies of said carburetors in good heat conducting contact therewith.

7. A flow system for an engine-pump assembly having an engine including carburetor means having a body and a cooling system including a cooling water flow path having an inlet and an outlet, and a pump mounted adjacent said engine and including a pump inlet having water supplied thereto and a pump discharge passage delivering water at a high pressure comprising:

first flow conduit means for delivering water at said high pump pressure from the discharge passage of said pump to the inlet of the cooling water flow path of the engine cooling system, second conduit means for delivering water from the outlet of the cooling water flow path of the engine cooling system to the inlet side of said pump, and a heat exchanger means contained in said second conduit means for applying the heat within said water discharged from said engine cooling system to the engine carburetor means to prevent icing thereof, including a pair of heat exchanger blocks each of which is mounted on a side portion of said body of said carburetor means in good heat conducting contact with said body of said carburetor means, said pair of blocks each having an internal passage through which said water flows, the internal passage of one of said blocks having an inlet for receiving the water from the engine cooling system and an outlet for discharging water therefrom, the internal passage of the other of said blocks having an inlet for receiving water and an outlet for discharging water therefrom, and including a crossover conduit for delivering water flow from the outlet of said internal passage of said one block to the inlet of said internal passage of said other block, said blocks being vertically arranged and said crossover passage being located at the upper end of said vertically arranged blocks.

8. A flow system according to claim 2 wherein said pair of blocks each have an internal passage through which said water flows, the internal passage of one of said blocks having an inlet for receiving the water from the engine cooling system and an outlet for discharging water therefrom, the internal passage of the other of said blocks having an inlet for receiving water and an outlet for discharging water therefrom, and including a crossover conduit for delivering water flow from the outlet of said internal passage of said one block to the inlet of said internal passage of said other block.

9. A flow system according to claim 8 including a muffler for receiving the hot exhaust gases of said engine, manifold means providing a cooling water manifold chamber contained in said first conduit means and arranged so that the water delivered to the engine cooling system flows therethrough, a metering orifice member mounted in manifold means for metering the amount of water delivered to the engine cooling system, said manifold means being mounted in heat conducting relationship with said muffler so as to be heated thereby.

10. A flow system according to claim 9 including a strainer mounted in said manifold chamber to strain the liquid passing therethrough, said strainer being heated by said muffler to prevent icing thereof.

11. A flow system according to claim 6 wherein said heat exchanger blocks are arranged on opposite side portions of said carburetor bodies to apply heat to said carburetor bodies from two opposite directions.

12. A flow system according to claim 11 wherein said heat exchanger blocks are mounted in contact with said carburetor bodies at mating machined flat faces on both said heat exchanger blocks and said carburetor bodies.

* * * * *